United States Patent [19]

Abdenour et al.

[11] Patent Number: 4,690,352

[45] Date of Patent: Sep. 1, 1987

[54] AIRCRAFT ROTATING WING SEAL

[75] Inventors: Stephen F. Abdenour, Akron; Stephen M. Polatas, Parma, both of Ohio

[73] Assignee: The B.F. Goodrich Company, New York, N.Y.

[21] Appl. No.: 890,057

[22] Filed: Jul. 28, 1986

[51] Int. Cl.⁴ ............................................. B64C 3/56
[52] U.S. Cl. ...................................... 249/49; 244/130
[58] Field of Search ............ 244/46, 49, 129.1, 129.4, 244/129.5, 130, 131, 3.27–3.29; 277/167.5, 178, 190; 49/392, 393; 114/282

[56] References Cited

U.S. PATENT DOCUMENTS

| | | | |
|---|---|---|---|
| 555,726 | 3/1896 | Hugo | 49/392 |
| 1,317,960 | 10/1919 | Cobb | 49/392 |
| 1,614,564 | 1/1927 | Lynch | 49/392 |
| 3,155,344 | 11/1964 | Vogt | 244/46 |

Primary Examiner—Galen Barefoot
Attorney, Agent, or Firm—Woodrow W. Ban

[57] ABSTRACT

A seal for use between a turntable rotatable aircraft wing and an aircraft fuselage. The seal consists of a pair of sections, one rotatable and one stationary, each having forward and rearward portions separated by a point of inflection. The forward motion of the rotating section is made thicker by at least 1% than the rearward portion of the rotating section.

13 Claims, 6 Drawing Figures

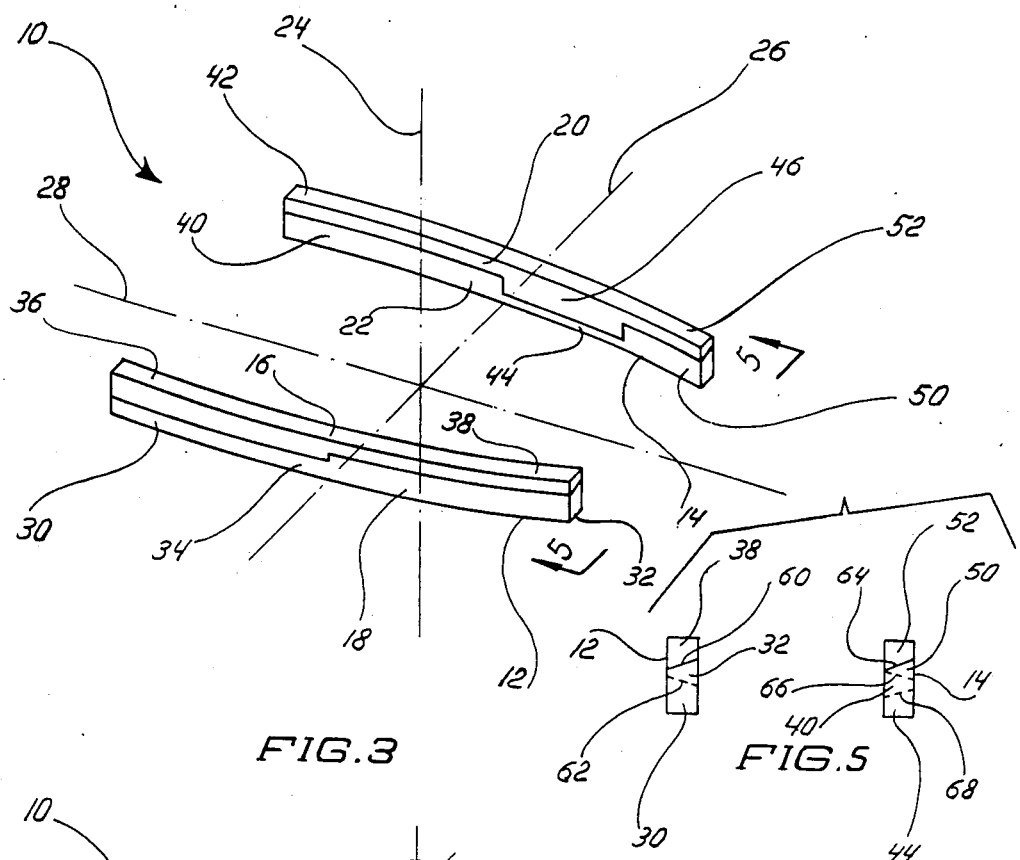
FIG.3
FIG.5
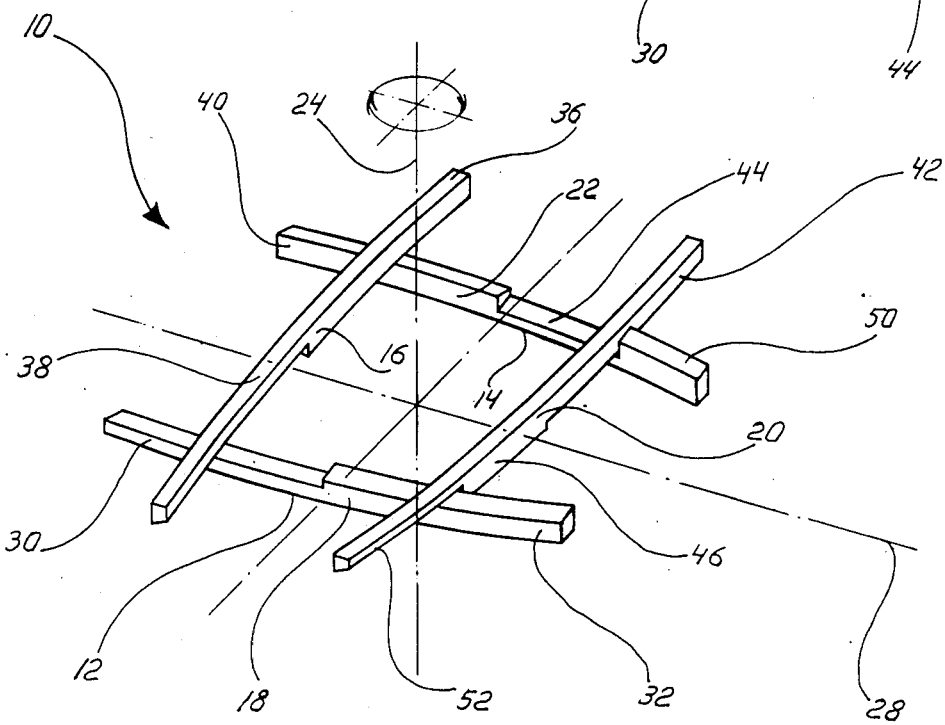
FIG.4

AIRCRAFT ROTATING WING SEAL

This is a related application to Ser. No. 890,056 filed on July 28, 1986, entitled "Aircraft Rotating Wing Seal and Method Therefor".

FIELD OF THE INVENTION

This invention relates to seals and sealing method for use between surfaces of an aircraft. More particularly, this invention relates to means and methods for sealing between an aircraft wing and an aircraft fuselage component to close gaps that may exist by reason of the aircraft wing being rotatable from an inflight position generally perpendicular to a center line of the fuselage to a stowage position wherein the wing generally parallels a center line of the fuselage.

BACKGROUND OF THE INVENTION

Fixed wing aircraft have achieved a large measure of utility in contemporary society. Such aircraft have found utility in tasks ranging from simple acts such as crop dusting, to commercial transportation of goods and persons, to important strategic and military missions. From time to time throughout the development of fixed wing aircraft, it has been necessary for such aircraft to be operated from and stowed within facilities characterized by relatively limited space. An example of such a space limited facility would include an ocean going aircraft carrier capable of conducting flight operations while underweigh.

The problem of how to integrate a large number of fixed wing aircraft into a container such as an aircraft carrier having a relatively modest volume has been a subject of substantial creative endeavor. Because of the exaggerated, cross-like shape of most fixed wing aircraft, their stowage tends to be space inefficient.

One suggestion providing for an increased density of fixed wing aircraft stowage in a limited space has been the fabrication of aircraft wings having an inflection point along the wing to either side of the fuselage at which inflection point the wing may be hinged in an upwardly direction thereby effectively shortening the wing span of the aircraft during stowage. Such a solution, however, can produce an aircraft configuration during stowage in which the aircraft by reason of the upwardly folded wings is characterized by a substantially elevated height dimension. This increased height dimension can interfere with free movement of the aircraft from one point of stowage to another, particularly in a crowded confine such as an aircraft carrier which may have interfering overhead decks, bulkheads, piping, and the like.

More recently, it has been suggested that a wing may be mounted in a turntable like manner atop an aircraft fuselage. In flight, the centerline of the aircraft wing is fixed approximately perpendicularly to a center line of the aircraft fuselage. During stowage, the wing is rotatable from the inflight position in a particular direction to eventually rest for stowage in a position where the centerline of the wing substantially parallels the centerline of the fuselage. This rotational stowage position effectively provides for a very narrow, very stowable aircraft profile while not contributing substantially to a height requirement necessary to define a "box" capable of containing the length, width and height dimensions of the aircraft being stowed.

With respect to such a "turntable" wing configuration, an opportunity exists for the presence of a gap or space between the wing and surfaces or components of the fuselage immediately adjacent the wing while the wing is positioned for flight. Such a gap, if unsealed, could pose undesirable aerodynamic inefficiencies.

Any seal employed to fill the gap between wing and fuselage components should be substantially resistant to the delaterious effects of extremes of temperature. Such seals typically would encounter frigid temperatures associated with upper atmosphere flying or stationing of the aircraft at geographic locations where temperatures can dip to levels substantially below 0° C.

In addition, depending upon configuration, portions of seals when rotated one across the other as a wing is rotated from an inflight position to a stowage position, can subject opposing members of the rotating seal to substantial compressive forces. These compressive forces can permanently deform or tear such seals, particularly where alastomeric, resulting in potential disfunctional non-sealing at certain points along the seal. Additionally, seals which effect a sealing action by substantial compressive action can with time permanently deform thereby losing seating effectiveness.

A non compression seal for sealing between wing and fuselage of an aircraft having a wing rotatable from an inflight to a stowage position wherein the wing substantially parallels the fuselage and wherein the seal is configured to be relatively free of distortional forces during such rotation, could find substantial application in the construction of aircraft configured for performance in services where rotational wing stowage is desired.

Likewise, a method for sealing between a wing and a fuselage in configurations where the wing is rotatable from an inflight position to a stowage position wherein the longitudinal axis of the wing substantially parallels the longitudinal axis of the fuselage, and wherein the seal is substantially free of compressive strains and stress during such rotation and during sealing, could find substantial utility in the manufacture and operation of such aircraft.

SUMMARY OF THE INVENTION

The present invention provides a seal for use in aircraft where the aircraft are characterized by a turntable mounted wing configured for rotation in a particular direction about a rotational axis from an inflight position wherein a longitudinal axis of the wing is substantially perpendicular to a longitudinal axis of the fuselage to a stowage position wherein the longitudinal axis of the wing substantially parallels the longitudinal axis of the fuselage. In such a wing-fuselage configuration, a gap or space typically exists between the wing and the fuselage while the wing is in the inflight position and this gap requires the sealing.

The seal of the present invention provides a seal element positioned to fill and seal the gap, the seal element including a pair of sections. One of the sections is affixed to a fuselage component and the remaining section is affixed to a wing. component. The fuselage attached section includes a forward portion and a rearward portion with respect to the direction of rotation of the wing from the inflight position to the stowage position. Each such portion is possessed of a length, width and height and the portions are separated by an inflection point. The fuselage attached section forward portion is possessed of a thickness generally parallel to the axis of rotation reduced by at least 1% from a corresponding thickness of the fuselage attached rearward portion. The other section, attached to the wing, is possessed of corresponding forward and rearward portions configured to mate with the portions of the fuselage attached section to produce a seal having a desired thickness in a direction generally parallel to the rotation axis.

Preferably, the portions of the sections of the seal elements are beveled whereby engagement of the fuselage attached section and the wing attached section occurs along the beveled surface. The bevels, in mating, establish a sealing surface to seal or bridge the gap between wing and fuselage. Typically in applications involving aircraft having such a turntable mounted wing, a pair of seals will be required to seal between port fuselage and port wing and between starboard fuselage and starboard wing; the second seal is configured generally in accordance with the first seal element. It may be necessary, however, for each section of the second seal element to include a leader portion positioned in advance in a direction of rotation of the wing from the inflight to the stowage position. These leader portions are configured to precede, in the direction of rotation, the forward portion of each section of the second seal element. The leader portion of the fuselage attached section of the second seal element is of a thickness greater than the thickness of the rearward portion of the fuselage attached section of the first seal element. The second seal element includes a corresponding nonfuselage attached section having a leader portion corresponding to and configured to mate with the leader portion of the fuselage attached section of the second seal element to define thereby a seal having a desired thickness in a direction generally parallel to the axis of rotation.

The seals of the invention are formed typically from a material selected from a group of elastomers. The group includes silicon rubbers, chlorinated silicon rubbers, chlorinated rubbers, nitrile rubbers, natural rubbers, synthetic styrene-butadiene rubbers, acrylonitrile-butadiene-styrene co-polymers, polyolefins, polyvinyls, and polyacrylates. Because of the elastomeric nature of these seal elements, it is desirable that the reduction percentage of the thickness of the forward portion with respect to the rearward portion of each seal element section preferably exceed 1% and most preferably exceed 5%.

In typical application, the gaps requiring sealing according to the invention while the wing is in the inflight position are positioned between the port and starboard fuselage components and the wing surfaces immediately adjacent the components.

These and other features and advantages of the invention will become more apparent when considered in light of a detailed description of the invention and in conjunction with the drawings which follow, together forming a part of the specification.

DESCRIPTION OF THE DRAWINGS

FIG. 3 is a depiction in perspective of a seal made in accordance with the invention.

FIG. 4 is a depiction in perspective of a seal made in accordance with the invention and rotated 90° from the depiction in FIG. 3.

FIG. 5 is a cross sectional representation along line A—A in FIG. 3.

BEST EMBODIMENT OF THE INVENTION

The present invention provides a seal for use in closing a gap or space existing between an aircraft fuselage component or surface and a turntable mounted wing upon the fuselage while the turntable mounted wing is in an inflight position.

Figure 1:
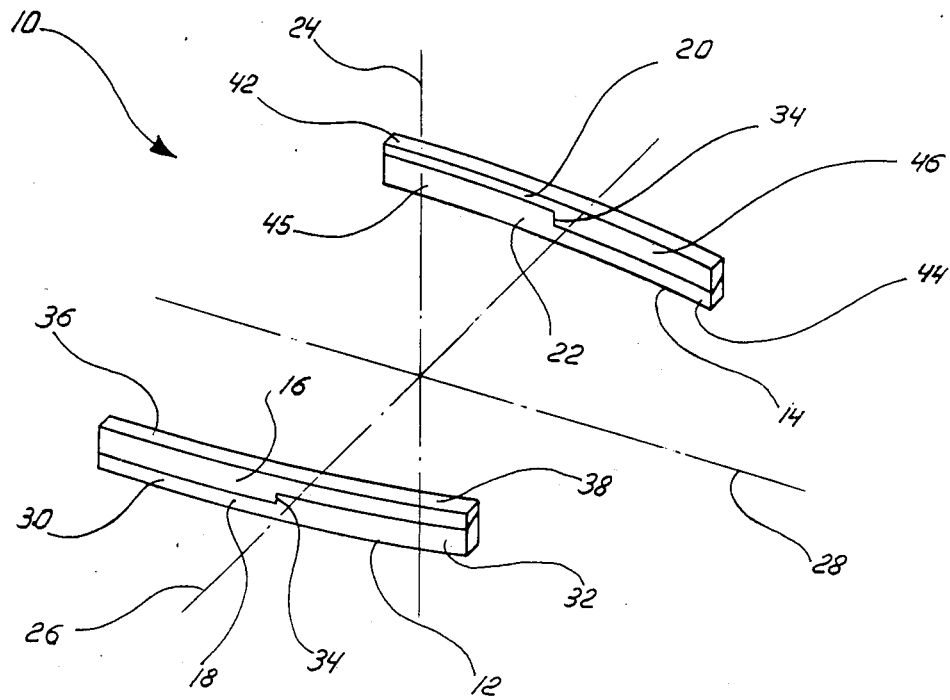
FIG. 1 is a perspective view of a seal made in accordance with the invention.

Referring to the drawings, FIG. 1 is a depiction of a seal 10 made in accordance with the invention. The seal 10 includes first and second seal elements 12, 14, the seal element 12 includes an upper section 16 and a lower section 18. The seal element 14 likewise includes an upper section 20 and a lower section 22.

The seal elements 12, 14, are affixed to an aircraft with the lower sections 18, 22 being affixed to components (not shown in FIG. 1) of an aircraft fuselage, and the upper sections 16, 20, being affixed to wing components (not shown in FIG. 1) of the aircraft. The wing (not shown in FIG. 1) is configured for rotation about an axis 24, hereinafter termed the axis of rotation. It is about the axis of rotation 24 that the wing (not shown in FIG. 1) rotates from a position wherein a wing centerline 26 is positioned generally perpendicular to a fuselage centerline.28 to a position wherein the wing center line 26 generally parallels the fuselage centerline 28. In FIG. 1, the wing centerline 26 is configured to rotate in a clockwise manner about the axis of rotation as viewed from above the aircraft to achieve a relative parallel position with respect to the fuselage centerline 28. When the centerlines 26, 28 are generally parallel, the wing is positioned for stowage; when the wing and fuselage centerlines 26, 28 are generally perpendicular, the wing is configured for flight.

In FIG. 1, the seal element 12 includes a fuselage attached section 18, having a forward portion 30 and a rearward portion 32. The forward and rearward portions 30, 32 are separated by a point of inflection 34. A wing attached section 16 also includes forward and rearward portions 36, 38 respectively. These forward and rearward portions 36, 38 are likewise separated by the point of inflection 34.

The point of inflection 34 is determined to be the point at which motion of the wing centerline 26 associated with the wing (not shown) about the axis of rotation 24 in a direction from an inflight to a stowage position causes motion of the wing attached section 16 rearward portion 38 of the seal element 12 in a direction away from the fuselage centerline 28 while the forward portion 36 of the wing attached section 16 is directed in a motion generally toward the fuselage centerline 28. This point of inflection 34 is stationery with respect to motion towards or away from the fuselage centerline 28 at the instantaneous moment of commencement of rotation of the wing centerline 26 from the inflight position to the stowage position.

The portion 30 of the lower section 18 is configured to be less thick in a direction generally parallel to the axis of rotation 24 than the rearward portion 32. This difference in thickness provides that as the wing centerline rotates to a stowage position, the wing attached rearward portion 38, of the wing attached section 16 of the seal element 12 passes across the fuselage attached section 18, forward portion 30 of the seal element 12 whereby no contact is engendered between the portion 38 and the portion 30. Thus, after break away of the seal sections 16, 18, no seal deformation occurs and no resistance to rotation associated with seal section to seal section contact characterizes the rotation of the wing. This lack of contact avoids damage to the seal 12 element during rotation, and facilitates movement of the wing by decreasing resistance associated with wing rotational motion. The seal portions 36, 38 mate with the seal portions 30, 32.

The seal element 14 likewise has a fuselage forward fuselage attached portion 44 and a wing forward attached portion 46 together with a fuselage attached rearward portion 40 and a wing attached rearward portion 42. In the seal element 14, the direction of rotation dictates that the portion 46 be configured to be relatively thick in a direction generally parallel to the axis of rotation 24 leaving the fuselage attached portion 44 thinner in a direction generally parallel to the axis of rotation than the rearward portion 40.

Figure 2:
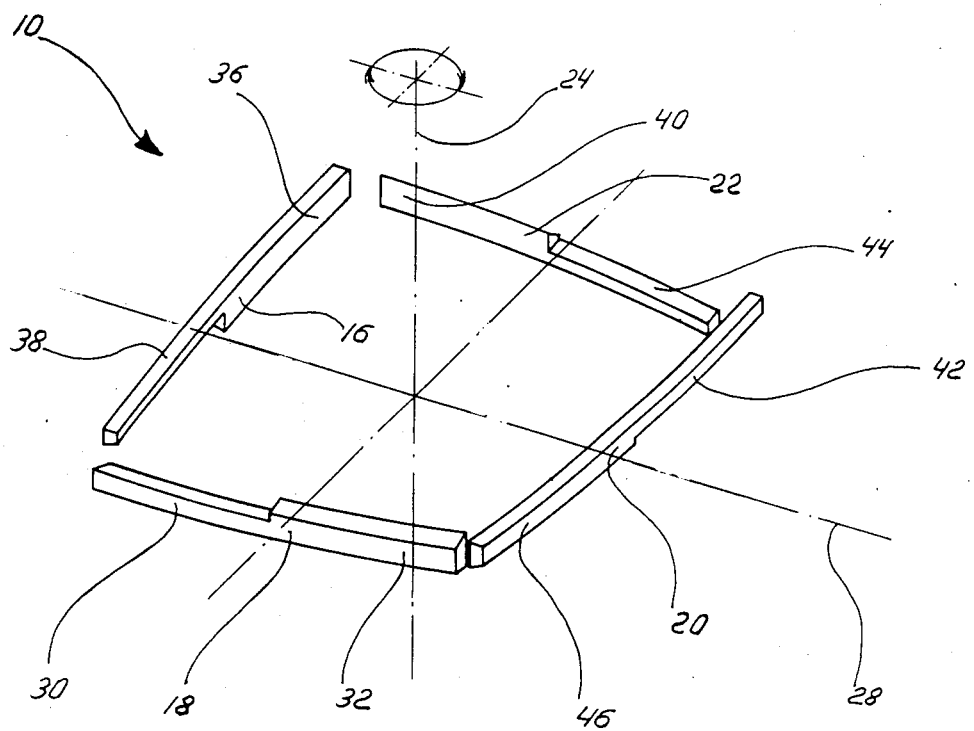
FIG. 2 is a perspective view of a seal made in accordance with the invention rotated 90° from the depiction of FIG. 1.

Referring to FIG. 2, the seal of FIG. 1 is shown rotated 90° to a position wherein the longitudinal centerline of the fuselage 28 and the longitudinal centerline of the wing 26 are generally parallel. The differing thicknesses between the forward portions 30, 44 of the fuselage attached sections 18, 22 permit the rearward portions 38, 42 of the wing attached seal sections 16, 20 to pass over the forward portions 30, 44 without substantial interference.

Referring to the drawings, FIG. 3 is a representation in substantial conformity with the representation of FIG. 1, that is of a seal for use in a turntable mounted aircraft wing. In FIG. 3, elements having like fit and function to the FIG. 1 depiction bear like reference numbers. So, therefore, in FIG. 3 a pair of seal elements 12 14, are provided having fuselage attached sections 18, 22 and wing attached sections 16, 20. Upper portions 36, 38, 42, 46 and lower portions 30, 32, 40, 44 are provided which function as in FIG. 1.

A distance between the axis of rotation 24 and the seal element 12 in FIG. 3 is exceeded by a length of the seal element from the point of inflection 34 to one or the other ends of the seal element 12. Where such relative distances obtain, as the seal element rotates from the inflight position wherein the longitudinal axis of the wing 26 is generally perpendicular to a longitudinal axis of the fuselage 28 to a position as shown in FIG. 4, the wing mounted forward portion 36 would protrude beyond and collide with the fuselage mounted rearward portion 40 of the seal element 22. Leader portions 52, 50 therefore are provided on the seal element 14. The leader portion 52 is configured typically by being made thinner in a direction generally parallel to the longitudinal axis 24 than the rearward portion 38 of the wing attached section 16 of the seal element 12 to permit the portion 52 to override the portion 32 upon rotation of the seal. Likewise, the leader portion 50 of the fuselage attached section 22 of the seal element 14 is configured, typically by being made thicker in a direction generally parallel to the longitudinal axis of rotation 24, then a corresponding rearward portion 32 of the fuselage attached section 18 of the seal element 12 to permit the override.

The leader portion 52 thereby overrides the rearward portion 32 as the seal elements 12, 14 are rotated by motion of the wing (not shown) from an inflight position wherein a longitudinal axis of the wing 26 generally is perpendicular to a longitudinal axis 28 of the fuselage to a position wherein the longitudinal axes 26, 28 are generally parallel. The portion 36 is configured with respect to the portion 42 so that the portion 36 can pass over the portion 40 upon rotation.

Again, the portions 52, 36 override the portions 32, 40 respectfully without substantial interference during rotation of the seal elements 12, 14. Accordingly, resistance to the motion of the wing is reduced and seal life enhanced by a lack of sliding and compressive forces on the seal elements during rotation.

Referring to FIG. 5, the seal elements 12, 14, are shown in cross section. The portion 38 is possessed of a bevel 60; the portion 30 is possessed of a bevel 62. The bevels 60, 62 are oppositely sloped.

In a seal element 14, the portion 52 includes a bevel surface 64; the portion 50 mates to the portion 52 along the bevel 64. The portion 44 includes a bevel 68 while the portion 40 includes a bevel 66. The bevels 64, 66, 68 are oppositely sloped one from the next.

As may be seen from FIGS. 4 and 5 considered together, when the seals 12, 14 rotate, the bevels are oriented in a direction so that the portions separate along the beveled mating surfaces and move away from the beveled mating surfaces in performing rotation.

Figure 6:
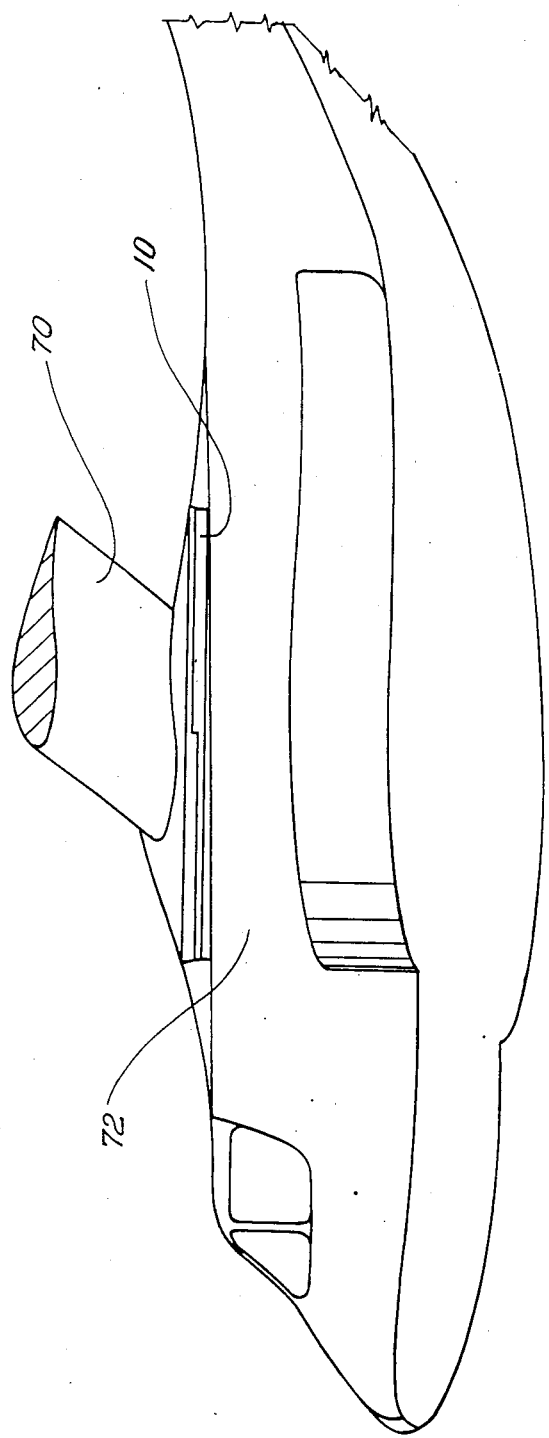
FIG. 6 is a representation of a seal installed aboard an aircraft.

Referring to the drawings, FIG. 6 is a depiction of the seal of the invention employed aboard an aircraft including the wing 70 rotatable upon a fuselage 72 from an inflight position to a stowage position. The seal fills and seals a gap between the fuselage or component thereof and the wing, or component thereof.

The seal elements 12, 14 are formed of an elastomer. By elastomer what is meant is a material, which upon deformation, from an original position, displays a significant tendency to return to its original shape. Elastomers suitable for use in the practice of the instant invention include silicon rubbers, chlorinated silicon rubbers, chlorinated rubbers, nitrile rubbers, natural rubbers, synthetic styrene-butadiene rubbers, acrylonitrile-butadiene-styrene co-polymers, polyolefins, polyvinyls and polyacrylates. Particularly preferred are synthetic and natural rubbers. Other suitable or conventional materials having generally elastomeric characteristics are believed useable in the practice of the invention. The portions 30, 44 and of the seal elements 12, 14 are reduced in thickness in a direction generally parallel to the axis of rotation from the portions 40, 32 by at least one percent (1%). Preferably this percentage exceeds 1% and most preferably exceeds 5%. This reduction in thickness permits the seal portions 38, 42 to pass over the fuselage attached portions 30, 44 respectively without substantial interference or contact.

The seal of the invention is applied to seal a gap between wing and fuselage components of an aircraft wherein the wing is rotatable from an inflight position to a stowage position through approximately 90°. The seal is applied typically in a pair of elements 12, 14, one element 12 configured to have upper and lower sections 16, 18, and another element 14 configured to have upper and lower sections 20, 22 each divided into forward and rearward portions separated by a point of inflection 34, one of the portions being attached to the fuselage, the other being attached to the wing, the wing rotating in a particular direction from the in flight position to the stowage position. The forward portions are configured in advance of the seal in the direction of rotation and the rearward portions of the seal sections not rotating are possessed of thicknesses in a direction generally parallel to the axis of rotation whereby the rearward portion of the rotating section passes over the forward portion of the non rotating section of each element without substantial interference or contact. The forward rotating portion is thereby thicker by at least 1% than the rearward portion of the same section.

The rotating seal section, affixed to the wing, is configured to have forward and rearward portions of the thickness configured to mate with the non rotating section to establish a uniform seal element having a generally uniform thickness in a direction generally parallel to the axis of rotation.

While a preferred embodiment of the invention is shown and described in detail, it should be apparent that various modifications may be made thereto without departing from the scope of the claims that follow.

We claim:

1. In an aircraft having a turntable mounted wing configured for rotation in a particular direction about a rotational axis from an inflight position wherein a longitudinal axis of the wing is substantially perpendicular to a longitudinal axis of a fuselage of the aircraft, to a stowage position wherein the longitudinal axis of the wing substantially parallels the longitudinal axis of the fuselage, and wherein a gap exists between the wing and fuselage while the wing is in the inflight position, the gap requiring sealing, a seal therefor comprising: (a) a seal element positioned to fill and seal the gap, the seal element including a pair of sections; (b) one of the sections being affixed to the fuselage, the remaining section being affixed to the wing; (c) the fuselage attached section including a forward portion and a rearward portion with respect to a direction of rotation of the wing from the inflight to the stowage position, each portion having a length, width, and thickness and the portions being separated by an inflection point; (d) the fuselage attached section forward portion having a thickness generally parallel to the rotational axis reduced by at least 1% from a corresponding thickness of the fuselage attached section rearward portion; and (e) the other section having corresponding forward and rearward portions configured to mate to the fuselage attached section portions to produce a seal having a desired thickness in a direction generally parallel to the rotation axis.

2. The seal of claim 1, the portions of the fuselage attached sections being beveled where mated to the other section portions with the rearward portion bevel being oppositely sloped from the forward portion bevel, the other section portions being beveled in a configuration to mate with the fuselage attached section portions bevel to seal between wing and fuselage sections with the wing in an inflight position.

3. The seal of claim 1, the reduction percentage being at least 5%.

4. The seal of claim 2, the reduction percentage being at least 5%.

5. The seal of any one of claims 1-4 including a second seal element configured in accordance with the first seal element, one seal element being positioned to seal between a port aircraft wing and a port fuselage component and the remaining seal being positioned to seal between a starboard aircraft wing and a starboard fuselage component.

6. The seal of claim 5, the second seal element including a fuselage attached section having a leader portion, the leader portion positioned in advance, in the direction of rotation, of the forward portion and having a desired thickness in a direction generally parallel to the axis of rotation, and the second seal element including a corresponding wing attached portion having a leader portion of a thickness parallel to the axis of rotation configured to pass over the rearward portion of the fuselage attached section of the first seal element during wing rotation to the stowage position and corresponding to and configured to mate with the leader portion of the fuselage attached section of the second seal element to define a seal having a desired thickness in a direction generally parallel to the axis of rotation.

7. The seal of any one of claims 1-4, the elements being formed from a material selected from a group of elastomers consisting essentially of: silicon rubbers, chlorinated silicon rubbers, chlorinated rubbers, nitrile rubbers, natural rubbers, synthetic styrene-butadiene rubbers, acrylonitrile-butadiene-styrene co-polymers, polyolefins, polyvinyls and polyacrylates.

8. The seal of claim 6, the elements being formed from a material selected from a group of elastomers consisting essentially of: silicon rubbers, chlorinated silicon rubbers, chlorinated rubbers, nitrile rubbers, natural rubbers, synthetic styrene-butadiene rubbers, acrylonitrile-butadiene-styrene co-polymers, polyolefins, polyvinyls and polyacrylates.

9. In an aircraft having a turntable wing configured for rotation in a particular direction about a rotational axis from an inflight position wherein a longitudinal axis of the wing is substantially perpendicular to a longitudinal axis of a fuselage of the aircraft, to a stowage position wherein the longitudinal axis of the wing substantially parallels the longitudinal axis of the fuselage, and wherein a gap exists between the wing and the fuselage on both port and starboard fuselage surfaces while the wing is in the inflight position, the gaps requiring sealing while the aircraft is in flight, a seal assembly therefor comprising a: (a) a pair of seal elements, one seal element positioned to fill and seal the starboard gap, the other configured and positioned to fill and seal the port gap, these seal elements each including an upper and a lower section; (b) one of the sections of each seal element being affixed to the fuselage with the remaining section of each seal element being affixed to the wing; (c) the fuselage attached section including a forward portion and a rearward portion with respect to a direction of rotation of the wing from an inflight to a stowage position, each portion having a length, width, and thickness, the portions being separated by an inflection point; (d) the forward portion of each fuselage attached section having a thickness generally parallel to the rotational axis reduced by at least one percent (1%) from a corresponding thickness of the reaward portion of each fuselage attached section; and (e) the wing attached section of each seal element being attached to the wing and having corresponding forward and rearward portions configured to mate to the forward and rearward portions of the fuselage attached sections to produce a seal having a desired overall thickness in a direction generally parallel to the rotation axis.

10. The seal of claim 9, the portions of the fuselage attached sections being beveled where mated to the portions of the wing attached sections with the rearward portion of the fuselage attached sections being beveled in a direction oppositely sloped from the bevel of the forward portion, the forward and rearward portions of the wing attached sections being beveled in a configuration to mate with the forward and rearward portions of the fuselage sections to establish a seal between the wing and fuselage section while the wing is in an inflight portion.

11. The seal of claims 9 or 10, the reduction percentage being at least 5%.

12. The seal of claims 9, 10, or 11, the fuselage attached second seal element having a leader portion, the leader portion being positioned in advance, in the direction of rotation, of the forward portion, and having a desired thickness in a direction parallel to the axis of rotation, the second seal element including a corresponding wing attached section having a leader portion of a thickness parallel to the axis of rotation configured to pass over the rearward portion of the fuselage attached section of the first seal element during wing rotation to the stowage position and corresponding to and configured to mate with the leader portion of the fuselage attached section of the second seal element to define a sealing having a desired thickness in a direction parallel to the axis of rotation.

13. The seal of claim 12, the elements being formed from a material selected from a group of elastomers consisting essentially of: silicon rubbers, chlorinated silicon rubbers, chlorinated rubbers, nitrile rubbers, natural rubbers, synthetic styrene-butadiene rubbers, acrylonitrile-butadiene-styrene co-polymers, polyolefins, polyvinyls and polyacrylates.

* * * * *